UNITED STATES PATENT OFFICE.

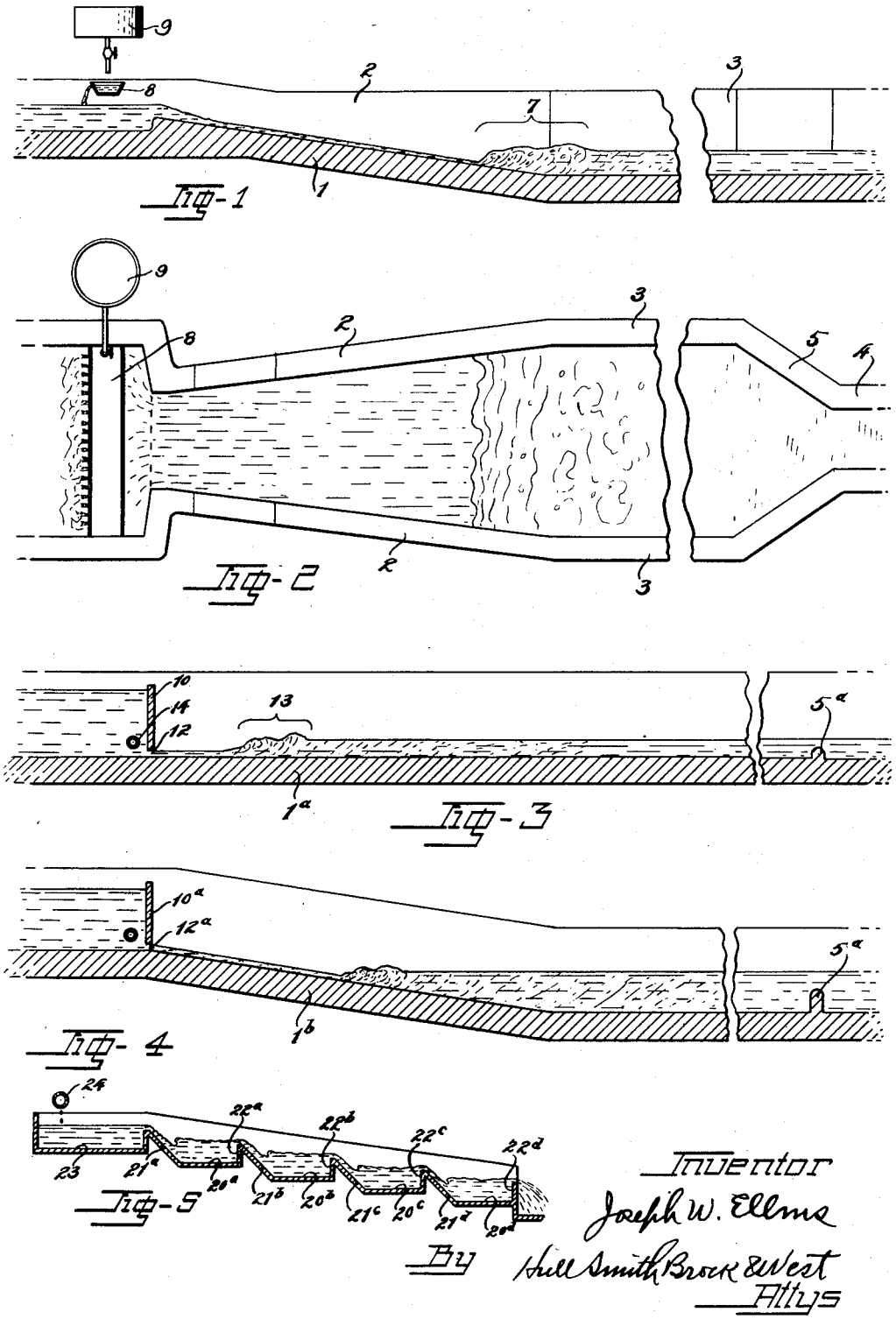

JOSEPH W. ELLMS, OF LAKEWOOD, OHIO.

APPARATUS FOR WATER PURIFICATION.

1,362,611.

Specification of Letters Patent.  Patented Dec. 21, 1920.

Application filed February 7, 1920. Serial No. 356,976.

*To all whom it may concern:*

Be it known that I, JOSEPH W. ELLMS, a citizen of the United States, residing at Lakewood, in the county of Cuyahoga and State of Ohio, have invented a certain new and useful Improvement in Apparatus for Water Purification, of which the following is a full, clear, and exact description, reference being had to the accompanying drawings.

This invention relates to water purification systems and has for its object the provision of a method and apparatus for the rapid, complete and uniform diffusion or mixing in such water of solutions of chemicals or crushed and ground solid chemicals more simply, quickly and cheaply than heretofore. In many water treating processes, such as clarification, rapid filtration, disinfecting, softening, etc., it is necessary to mix suitable chemicals with the water prior to the time that it passes through a settling basin or a filter bed or is subjected to some other action; and in order to accomplish this mixing, it has heretofore been thought necessary to employ systems of connected chambers covering large areas of ground and costing many thousands of dollars, mixing of the water and reagent being secured or attempted to be secured by means of baffles and other devices to break up the flow or sometimes even by mechanical stirrers.

The objects of my invention are the provision of a new and improved apparatus and method for performing this mixing whereby the diffusion of the chemicals or re-agents in the water may be effected with even greater thoroughness than hitherto, and in an extremely short space of time and by the use of apparatus employing only a small fraction of the ground space and structural work heretofore required; the provision of an apparatus and method for attaining the diffusion of the chemicals more rapidly and uniformly than hitherto; the provision of an apparatus which shall produce the requisite mixing with a minimum of power consumption and with a minimum of liquid under treatment at any one time; while further objects and advantages will appear hereinafter as this description proceeds.

My invention is characterized by the employment or utilization of the principle known as the hydraulic jump; that is to say: when a sheet of rapidly moving water strikes a body of water which is either standing still or moving with a lower velocity, the kinetic energy of the moving stream is very largely dissipated in the form of countless eddies and whirlpools accompanied by the entrainment of large quantities of air which seethe and bubble to the surface, the standing water being also elevated just below the point of impact to a height above the level of either the inrushing or the outflowing streams. This phenomenon occurs with all angles of the inflowing stream as compared with the horizontal; but is dependent upon a minimum velocity which is expressed by some investigators by $V = \sqrt{gd}$ and by others as $V = 2\sqrt{gd}$, wherein $g$ = gravity and $d$ = the depth of the inflowing sheet. It is further characteristic of my invention that I subject all the water to be treated to this action adding thereto the chemicals or re-agents to be mixed therewith at any time prior to the occurrence of this jump.

In the drawings accompanying and forming a part of this application, I have illustrated certain simple apparatus whereby my invention is embodied and performed, although it will be understood that these drawings are intended to be only diagrammatic and are designed to illustrate the principles only of my inventive idea inasmuch as the practical application of those principles may be effected with the use of many types of apparatus. In these drawings, Figure 1 is a longitudinal sectional view through a preferred apparatus; Fig. 2 is a top plan view of the device shown in Fig. 1; Figs. 3, 4 and 5 are vertical longitudinal sectional views through modified forms.

Describing by reference characters the parts shown in Fig. 1, 1 indicates the bottom and 2 the walls of a flat inclined chute down which the water to be treated is allowed to flow in a continuous stream. At the bottom of this chute is a pool having sides 3, 3 and a suitable bottom, the same communicating with an outlet flume or conduit 4. This outlet is preferably constricted in some manner, either by narrowing the sides as shown at 5—5 or by the employment of a shallow weir (shown at 5ª in Figs. 3 and 4), so as to maintain in the pool a depth of water several times as great as the thickness of the sheet which flows down the incline 1. The bottom of the pool may be rough or smooth, level or inclined, uniform or irregular, without affecting the operation provided only that the pool be sufficiently deep, and this depth may vary through very wide ranges without impairing the operation so long as it is sufficiently deep to absorb the impact of the inrushing sheet. I prefer a depth of from six to ten times that of the entering stream.

Under the conditions above illustrated, the hydraulic jump will occur approximately at the region indicated at 7; and if suitable chemicals, dyes, or other substances desired to be mixed with the water, are added thereto at any time prior to the occurrence of this jump a sudden and complete mixing will be achieved so that it is impossible to discover any variations between different samples of the water flowing out of the flume 4. A simple mode of adding the chemicals is by means of a horizontal trough 8 located above the upper end of the incline and notched at one side for the uniform discharge of the chemicals throughout the width of the stream as shown in Figs. 1 and 2, the chemicals being drawn from a suitable tank 9. The height and turbulency of the jump depends upon the velocity of the water at the moment of impact and this in turn depends upon the length and inclination of the chute 1. I have had excellent results with the use of a chute about 20 feet long and having a fall of one foot in seven. The angle of flare of the walls 2—2 may be varied within wide limits, being always maintained at a sufficiently low limit to avoid separation of contact of the water therewith and likewise sufficiently great to avoid any piling up of water against them. A flare of one foot in eight has been found to be extremely satisfactory; and with a depth of water on the chute of from two to three inches, I have found a depth in the pool of from one to three feet to give excellent results, while with a pool equal in length to that of the chute, the disturbance of the water is considerably reduced before it passes out through the flume.

In the embodiment shown in Fig. 3, the floor of the apparatus shown at $1^a$ is horizontal throughout and the necessary head of water is provided by a dam 10 beneath which is a laterally elongated slit 12, for example, two inches high; the head of water being equal to the fall along the chute shown in Fig. 1, the velocity of the issuing sheet will be the same, which meeting with the water in the pool produces a jump as shown at 13; a similarly complete mixing of chemicals can be obtained thereby, such chemicals being introduced in any suitable manner as by means of a submerged pipe 14. Experience shows, however, that the position of such a jump is extremely hard to regulate since minute variations in the velocity of the issuing water will move the jump through large distances. It is therefore preferable to employ an inclined base at the point of the jump. In Fig. 4 such an inclined base is shown at $1^b$, the requisite speed of the water being produced partly by its flow down that base and partly by means of a dam $10^a$ from beneath which the water issues as shown at $12^a$. In this case, the jump will necessarily occur at a point along the incline.

It is entirely within my invention to employ a plurality of jumps in series as shown, for example, in Fig. 5 which illustrates an arrangement designed especially for chemical manufacturing plants, dye factories, etc. In this modification I have shown a series of pools or basins $20^a$, $20^b$, $20^c$, etc., each having a chute or incline $21^a$ etc. at one end and a weir $22^a$ at the other, the weir of one discharging upon the chute of the next. The substance to be mixed with the liquid may be introduced into the initial basin 23 from a suitable conduit 24, or different substances may be added to the successive basins to produce a progressive reaction.

It will be understood that many other changes in detail of apparatus and procedure may be made within the scope of my invention as defined in the annexed claims.

Having thus described my invention, what I claim is:

1. The process of mixing solutions or suspensions of substances in liquids characterized by subjecting the liquids simultaneously to the action of the same hydraulic jump.

2. The process of mixing a liquid with another liquid or finely divided solid which contains the steps of first adding the substance of smaller volume to that of greater volume, and second introducing a stream of the mingled substances moving at a comparatively high velocity into a pool of the same liquid moving at a lower velocity.

3. The process of mixing a liquid with another liquid or finely divided solid which contains the steps of discharging the liquid in the form of a flat transversely horizontal sheet into contact with a larger body of the same, and adding to such liquid the other liquid or solid at some point prior to such place of contact.

4. The process of mixing a liquid with another liquid or finely divided solid which contains the steps of injecting into a slowly moving body of such liquid a sheet of the same moving rapidly along a plane which approaches the horizontal, restricting the escape of such slowly moving body of liquid as to cause a depth therein from about three times to about twenty times that of the inflowing sheet, and adding the substance to be mixed therewith prior to the contact of said sheet and body.

5. Apparatus for mixing liquids comprising a basin having a restricted outlet and a flat substantially horizontal inlet, means for discharging a considerable head of the liquid into said basin by way of said inlet in the form of a flat, rapidly moving stream, and means for supplying the mixing substance to said liquid prior to its arrival in said basin.

6. Apparatus for mixing liquids comprising a chute having a substantially flat bottom and flaring walls, means for discharging a constant stream of liquid at high velocity along said chute, a basin into which said chute delivers and having a restricted outlet whereby the depth of liquid therein is maintained greater than that in said chute, and means for supplying the mixing substance to said liquid prior to its gaining its maximum velocity.

7. Apparatus for mixing liquids comprising a chute having a flat bottom slightly inclined from the horizontal, a basin into which said chute delivers, means for discharging a constant stream of liquid at high velocity along said chute into said basin, means for retarding the flow through said basin so that the depth of the pool therein shall be materially greater than that of the inflowing stream, and means for supplying the mixing substance to said liquid prior to its arrival in said basin.

8. Apparatus for mixing liquids comprising a chute having a flat bottom slightly inclined from the horizontal, a basin into which said chute delivers, means for discharging a constant stream of liquid at high velocity along said chute into said basin, means for supplying the mixing substance to said liquid prior to its arrival in said basin, and means for retarding the flow through said basin so that the depth of the pool therein shall be materially greater than that of the inflowing stream, the sides of said chute being flared and its bottom merging with the bottom of said basin.

In testimony whereof, I hereunto affix my signature.

JOSEPH W. ELLMS.